US006893558B1

(12) United States Patent
McGee et al.

(10) Patent No.: US 6,893,558 B1
(45) Date of Patent: May 17, 2005

(54) HIGH PRESSURE SOLID REMOVAL SYSTEM

(75) Inventors: Richard Harvey McGee, Houston, TX (US); Yong Fu Wang, Sugarland, TX (US); Garry Thomas Hill, Houston, TX (US)

(73) Assignee: Schooner Petroleum Services, Inc., Houston, TX (US)

( * ) Notice: Subject to any disclaimer, the term of this patent is extended or adjusted under 35 U.S.C. 154(b) by 154 days.

(21) Appl. No.: 10/345,520

(22) Filed: Jan. 16, 2003

Related U.S. Application Data

(60) Provisional application No. 60/352,450, filed on Jan. 28, 2002.

(51) Int. Cl.$^7$ .......................... E21B 21/06; B01D 21/26
(52) U.S. Cl. ................... 210/170; 210/251; 210/521.1; 210/533; 166/75.12
(58) Field of Search .................... 166/105.1, 75.12; 210/170, 251, 304, 305, 313, 512.1, 533

(56) References Cited

U.S. PATENT DOCUMENTS

| | | | | |
|---|---|---|---|---|
| 2,118,094 A | * | 5/1938 | Moore et al. | 166/87.1 |
| 3,947,364 A | * | 3/1976 | Laval, Jr. | 210/512.1 |
| 5,570,744 A | * | 11/1996 | Weingarten et al. | 166/357 |

* cited by examiner

Primary Examiner—Terry K. Cecil
(74) Attorney, Agent, or Firm—Buskop Law Group, P.C.; Wendy Buskop

(57) ABSTRACT

The invention is a high pressure trap for removing particles from a flow stream of a high pressure well that maintains the full pressure of the high pressure well, wherein the trap has an inlet port connected to a Christmas tree, a chamber with a top flange, a bottom flange, and a side wall connecting the top flange and the bottom flange in fluid communication with a choke manifold, a dump outlet in communication with the bottom reservoir and connected to the bottom flange, a dump outlet controller for opening and closing the dump outlet, and a tube disposed between the bottom reservoir and the side outlet, wherein the tube is mounted within the chamber to the top flange without contacting the side wall, thereby the velocity of the flow stream is changed as the flow stream is passed from the tube into the chamber.

15 Claims, 1 Drawing Sheet

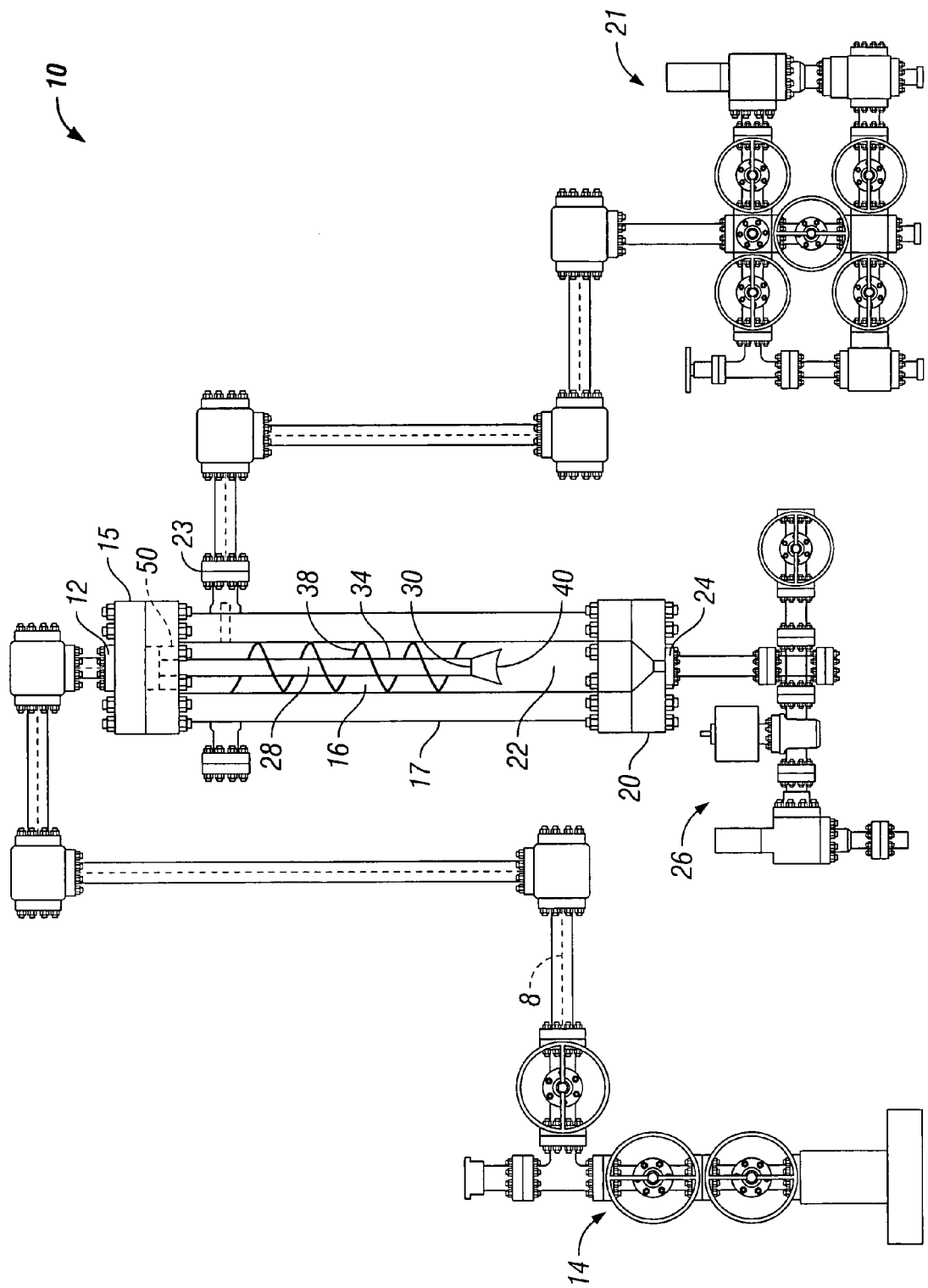

HIGH PRESSURE SOLID REMOVAL SYSTEM

The present application claims priority to Provisional Patent Application Ser. No. 60/352,450 filed in the U.S. Patent and Trademark Office on Jan. 28, 2002.

FIELD OF THE INVENTION

The invention relates to the removal of sand, or rock or other particulate matter from a flow stream at high pressure, before the flow stream reaches manifolds or other production or drilling equipment with moving parts, which is typically called a sand knock out system.

The invention further relates to equipment for use in a fluid producing well. In particular, the invention is disclosed as apparatus for separating sand from the fluids extracted from a well. The description, which follows, discloses the invention in use with an oil well, or a natural gas well, but the invention is not limited to such use.

BACKGROUND OF THE INVENTION

A need has long existed for a device, for completions, which is inexpensive but can maintain the high pressure of a well, in the range of 15,000 psi, while removing particles such as sand from the flow stream. The present invention meets that need.

In flowing fluids from a well, such as an oil well, or natural gas well, certain difficulties may arise depending upon the nature of the fluids being extracted. Frequently, sand is encountered as fluid is taken from the well. Sand, rock, and plug material must be separated from the liquid or natural gas flow to keep the completions running. If equipment is employed to remove the fluids, it is desirable that the rock and sand be removed from the other fluids or gasses before the liquid and/or natural gas enters the equipment, the equipment may stop working as effectively.

Particulate matter, especially sand, tends to abrade the moving surfaces into which the sand-bearing liquids, dry gas, wet gas and similar flow streams come into contact. For example, production equipment has a significantly shortened working lifetime when the liquids carry sand or other abrasive particulate matter.

Sand strainers are commercially available for insertion into a well casing to separate sand or other particulate matter from a flow stream. However, a need has existed for a sand or rock remover, which performs at high pressures, such as between 8,000, and 20,000 psi.

It is the objective of the present invention to provide a simple particulate removal device, particularly adapted for removing sand from flow streams as they come from the well.

It is a further object of the invention to remove waterborne sand, or oil-borne sand, or both from a flow stream.

With these and other objects in mind, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

For purposes of promoting an understanding of the principles of the invention, reference will now be made to the embodiments illustrated in the drawings and specific language will be used to describe it. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

SUMMARY OF THE INVENTION

The present invention contemplates a high pressure device for removing particles such as sand from a flow stream of a high pressure well while the device maintains the full pressure of the well.

Preferably the device comprises an inlet port connected to a Christmas tree; a flange connected to the inlet port, a chamber connected to a top flange, a bottom flange connected to the chamber, a bottom reservoir formed in the chamber, a side wall connecting the top flange and the bottom flange, and wherein the side wall comprises a side outlet in fluid communication with a choke manifold; a dump outlet in communication with the bottom reservoir and connected to the bottom flange; and a dump outlet controller for opening and closing the dump outlet. In addition, a tube is connected to the top flange and the tube has a plate, which winds around the outside of the tube in a helical fashion creating a cyclonic effect with the flow stream.

One embodiment of the invention contemplates a high pressure method for removing particles from the flow stream of a high pressure well, comprising the steps of: flowing the high pressure flow stream into an inlet; flowing the flow stream into a tube; ejecting the flow stream from the tube into a chamber thereby changing the velocity of the flow stream; using a plate wound helically around the outside surface of the tube to contact the flow stream creating a cyclonic effect which removes particles from the flow stream; collecting a portion of the particles from the flow stream into a reservoir forming a cleaner flow stream; removing the remaining particles from the cleaner flow stream while flowing the cleaner flow stream toward a side outlet over the plate, collecting the remaining particles in the bottom reservoir forming collected particles; and dumping the collected particles from the bottom reservoir using a dump outlet controller.

The invention further contemplates high pressure production apparatus for trapping particles from a high pressure well comprising: a Christmas tree; a high pressure trap connected to the Christmas tree wherein the trap comprises: an inlet port connected to the Christmas tree; a chamber having a top flange connected to the inlet port and a bottom flange connected to a bottom reservoir and a side wall connecting the top flange and the bottom flange, and further wherein the side wall comprises a side outlet in fluid communication with a choke manifold; a dump outlet in communication with the bottom reservoir connected to the bottom flange; a dump outlet controller for opening and closing the dump outlet; a tube having a first end connected to the top flange, and a second end opening into the chamber and as the flow passes through the tube and out of the orifice, the flow rate is changing the velocity of the flow stream, wherein the tube has an inside surface and an outside surface, and further wherein a plate is disposed on the outside surface and is oriented in a helical arrangement around the outside surface, and further wherein the tube is mounted within the chamber to the top flange, without contacting the side wall and is disposed between the bottom reservoir and the side outlet; and a choke manifold connected to the high pressure trap.

One further embodiment of the invention contemplates a sand separator for use in separating sand and other particulates from a flow stream from a well comprising: an inlet for receiving the flow stream; a sand trapping chamber coupled to the inlet; a tube with a high velocity orifice also has plates helically oriented on the outside surface of the tube. Additionally, a deflector is used at the end of the tube to deflect fluids from the tube and into the chamber. The plates are oriented on the outside of the tube such that they cause a cyclonic effect within the chamber as the flow stream moves from the tube orifice to the outlet of the chamber. The high velocity orifice of the tube through which liquids are expelled into the sand trapping chamber, expels sand /and particulate matter carried by the flow stream and accelerates the flow stream through the high velocity orifice and then decelerated as the flow stream enters the sand trapping chamber as the sand trapping chamber has a greater flow section area than the inlet tube. This change in flow section area, changes the velocity of the flow stream causing a portion of the sand and particulate matter carried by the flow stream to fall to a bottom reservoir. As the flow stream passes up the outside of the tubing along the plates on the outside surface; remaining sand and particulate matter drop toward the bottom of the sand trapping chamber and are collected in the bottom reservoir. Sand and particulate matter additionally collected on the plates then fall to the bottom reservoir, and the bottom reservoir is opened to allow egress of the sand and particulate matter from the sand trapping chamber.

BRIEF DESCRIPTION OF THE DRAWINGS

A specific embodiment of the invention will be described by way of example with reference to the accompanying drawings, in which:

FIG. 1 is an overview of the system.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

While drilling or during operations, material coming from the well can include a combination of oil and sand and possibly rock in the flow stream. The rock, and sand impede the flow of the oil or natural gas or desired material coming from the well. A need has existed to reduce the amount of sand in the flowing oil or natural gas from a well. The invention provides a method to reduce sand in the oil or natural gas flow from a well.

The invention is a sand trap or device for collecting rock, sand, or other particulate matter from a high pressure well.

Referring to FIG. 1, the invention is a high pressure device or trap 10 for removing particles from a flow stream 8 from a high pressure well through a Christmas tree 14, such as an oil well or natural gas well wherein the trap maintains the full pressure (psi) of the well.

In the most preferred embodiment, the trap 10 has an inlet port 12 connected to the Christmas tree 14.

A top flange 18 connects to the inlet port 12. The flange 18 engages a chamber 16 and bottom flange 20. Side wall 17 connects between top flange 18 and bottom flange 20. Bottom flange 20 connects to a bottom reservoir 22. Side outlet 23 is disposed in the side wall 17 is in fluid communication with a choke manifold 21.

A dump outlet 24 is connected to the bottom flange 20 and is in communication with the bottom reservoir 22. A dump outlet controller 26 can be connected to the dump outlet 24 and used for opening and closing the dump outlet 24. The dump outlet controller 26 can be a manual valve or manual controller, or alternatively, a hydraulic valve or hydraulic controller.

A tube 28 is secured to the top flange 18. The tube 28 has a first end 50 connected to the top flange 18, and a second end 30 opening into the chamber 16. The tube 28 has an inside surface (not shown) and an outside surface 34. A plate 38 is disposed on the outside surface 34 of the tube 28 and is oriented in a helical arrangement around the outside surface 34. The tube 28 is mounted within the chamber 16 to the top flange 18 such that the tube 28 does not contact the side wall 17 of the chamber 16. The tube 28 is disposed between the bottom reservoir 22 and the side outlet 23.

In the preferred embodiment of the invention, a deflector 40 can be mounted on the second end 30 of the tube 28 to increase the dispersion of the flow stream as it exits the second end 30 of the tube 28.

In the most preferred embodiment, the deflector 40 has a rounded downward shape similar to a downwardly facing "c" shape. The tube 28 is connected near the center of the "c" to facilitate the dispersion of the flow stream into the chamber. Other deflectors could be used which are conical, plates or box shaped.

In the most preferred embodiment, it is contemplated that the sand trap can sustain pressures between 8,000 psi and 20,000 psi, most preferably between 10,000 psi and 15,000 psi, and specifically, the pressure of the well.

It is contemplated that the flow rate through the trap would be between 1 million cubic feet per day and 400 million cubic feet per day for natural gas and would between 200 and 5000 barrels per day for oil.

It should be notated that the apparatus is designed such that the helically wound plate creates a cyclonic effect in the chamber and producing interference with the flow of the particles from the second end of the tube 28 to the side outlet 23. This plate can be formed from one plate cut from metal, or it can be made from a plurality of metal segments such as segmented plates welded together.

In an alternative embodiment, it is contemplated that the wall of the chamber could be coated with a ceramic material, a graphic composite material or combinations of these to improve wear on the chamber. Similarly, the inside surface of the tube 28 could be coated with the same material or combination to improve wear.

It should be noted that this trap can collect particles, which are selected from the group, rock, sand, cement, and drillable plug particles. Other particulate material can be trapped as well. Additionally, the high pressure trap can be made from a low alloy steel.

The invention also relates to a method for removing particles from the flow stream of a high pressure natural gas or oil well comprising the steps of: flowing the high pressure flow stream into an inlet; flowing the flow stream from the inlet into a tube. The next step involves ejecting the flow stream from the tube into a chamber thereby changing the velocity of the flow rate of the flow stream. Next the flow stream passes over a deflector, which is preferably, a "c" shaped deflector.

A plate, or alternatively, a plurality of plates, are wound helically around the outside surface of the tube and are used to contact the flow stream and create a cyclonic effect in the chamber changing the flow profile from a turbulent flow to a laminar flow.

A portion of the particles from the flow stream can be collected into a reservoir at the base of and the chamber based on the change in velocity of the flow stream forming a cleaner flow stream.

The next step is removing the remaining particles from the cleaner flow stream while flowing the cleaner flow stream toward a side outlet over the plate wound around the tube, collecting the remaining particles in the bottom reservoir forming collected particles; and dumping the collected particles from the bottom reservoir using a dump outlet controller.

FIG. 1 shows the invention as it relates to a production apparatus for trapping particles from an oil or natural gas well comprising: a Christmas tree 14 connected to a high pressure trap: wherein the trap comprises an inlet port connected to the Christmas tree; a chamber having a top flange connected to the inlet port and a bottom flange connected to a bottom reservoir and a side wall connecting the top flange with the bottom flange, and wherein the side wall comprises a side outlet in fluid communication with a choke manifold 21; a dump outlet in communication with the bottom reservoir and connected to the bottom flange; a dump outlet controller for opening and closing the dump outlet; a tube having a first end connected to the top flange, and a second end opening into the chamber, wherein the tube has an inside surface and an outside surface, and further wherein a plate is disposed on the outside surface of the tube and the plate is oriented in a helical arrangement around the outside surface of the tube, and further wherein the tube is mounted within the chamber, to the top flange, without contacting the side wall and is disposed between the bottom reservoir and the side outlet.

One further embodiment of the invention contemplates that the top flange and the bottom flange, can each be either one flange, two flanges bolted together, or a flange and a plate bolted together.

Bolts are the preferred attaching means of the tubing, flanges, inlets and outlets to facilitate repair of the chamber and the trap.

A typical inlet port size usable in this invention would be 3 1/16" ID with a 15,000 psi working pressure. A typical chamber usable in the invention would be 13 5/8" inner diameter and typically would be 7 feet long. A typical tube would be 5 feet long. The inner diameter of the tube would be 3". The deflector attached to the tube would be 3" across, and 6" wide. The side outlet would be 3 1/16" ID with a 15,000 psi. The dump outlet would be 2 1/16" ID with a 15,000 psi. The top flanges would each be about 8 1/16" thick, with 34 7/8" outer diameter and an inner diameter of 3 1/16". The top flange would be bolted to the chamber with about 20 bolts, each bolt being about 21" in length with a 2 1/4" diameter. The bottom flange would be identical to the top flange in the most preferred embodiment, although the flanges could be different in size and still be workable in the invention.

The helical plates 38 which attach to the outside surface of the tube would most preferably have a dimension of a 13 1/2" outer diameter welded to the 4 1/2" outer diameter of the tube. Typically about 40 to 50 plates, and preferably 45 plates would be welded together to form the helical plates of the invention.

The most preferred dump controller is a combination of a hydraulic gate valve and a hydraulic choke. However, either a hydraulic gate valve or a manual device could be used separately within the scope of the invention. A typical hydraulic gate valve usable in the invention would be a Cooper Cameron type FC 2 1/16" ID, with a 15,000 psi working pressure. A typical manual dump controller would be a plug valve having 15,000 psi working pressure.

A further embodiment of the invention contemplates a sand separator for use in separating sand and other particulates from flow being extracted from a well comprising: an inlet for receiving the fluids; a sand trapping chamber coupled to the inlet; a tube with plates on the outside surface for accelerating the flow being extracted from the well, a deflector on one end of the tube for deflecting the fluids from the tube into the chamber. The tube has a high velocity orifice through which liquids are expelled into the sand-trapping chamber. The velocity of the flow rate is decreased as the flow enters the chamber. The liquids, and any sand and particulate matter carried by the liquids, are accelerated through the high velocity orifice propelled against the deflector.

A portion of the sand falls to a bottom reservoir, and the fluid flow passes up the outside of the tube along the plates on the outside surface. The flow changes using a cyclonic effect to a laminar flow as it pass over the plates. Sand and particulate matter falls to the bottom of the sand-trapping chamber and is collected in the bottom reservoir. Sand and particulate matter collected on the plates also falls to the bottom reservoir. The bottom reservoir is opened to allow egress of the sand and particulate matter from the chamber.

One further embodiment of the invention contemplates the sand separator can be used to extract small particulate matter from both gaseous and liquid components.

The invention can be used with various types of production, completion and drilling equipment, including standard tubing completions, concentric completions, casing tubing, dual completions, and other multiple zone completions. All of these are compatible with no modification or special treatment necessary to the sand trap unless the sand trap needs to be installed subsea. For subsea applications, the invention can be used on diver less, diver assist, spool trees, platform tieback, side valve trees, vertical production tress, multi-well trees and several of the above. The invention can be used with all choke manifolds that serve the purpose which is controlling flow and reducing pressure. The manifold can be a drilling, production, well testing or more sophisticated subsea manifold.

The trap of the inventor is compatible with no modification to any of these system, While this invention has been described with emphasis on the preferred embodiments, it should be understood that within the scope of the appended claims, the invention might be practiced other than as specifically described herein.

What is claimed is:

1. A high pressure trap for removing particles from a flow stream of a high pressure well and wherein the trap maintains the full pressure of the high pressure well, comprising:
   a. an inlet port connected to a Christmas tree;
   b. a chamber having a top flange connected to the inlet port and a bottom flange connected to a bottom reservoir and a side wall connecting the top flange and the bottom flange, and further wherein the side wall comprises a side outlet in fluid communication with a choke manifold;
   c. a dump outlet in communication with the bottom reservoir and connected to the bottom flange;
   d. a dump outlet controller for opening and closing the dump outlet;
   e. a tube disposed between the bottom reservoir and the side outlet, wherein the tube comprises i. a first end connected to the top flange;
ii. a second end opening into the chamber;
iii. an inside surface;
iv. an outside surface;
v. a plate is disposed on the outside surface and oriented in a helical arrangement around the outside surface; and
vi. wherein the tube is mounted within the chamber to the top flange without contacting the side wall, and thereby the velocity of the flow stream is changed as the flow stream is passed from the tube into the chamber.

2. The high pressure trap of claim 1, wherein the trap can sustain pressures between 8,000 psi and 20,000 psi.

3. The high pressure trap of claim 2, wherein the trap can sustain between 10,000 psi and 15,000 psi.

4. The high pressure trap of claim 1, wherein the flow rate through the trap is between 1 million cubic feet per day and 400 million cubic feet per day.

5. The high pressure trap of claim 1, wherein the plate creates a cyclonic effect in the chamber while producing interference with the flow of the particles from the second end of the tube to the side outlet.

6. The high pressure trap of claim 1, wherein the plate is a plurality of segmented plates.

7. The high pressure trap of claim 1, wherein the chamber side wall is coated with a member of the group consisting of a ceramic material, a graphic composite material, and combinations thereof.

8. The high pressure trap of claim 1, wherein the dump outlet controller is a mechanical valve.

9. The high pressure trap of claim 1, wherein the dump outlet controller is a hydraulic mechanism.

10. The high pressure trap of claim 1, wherein the well is a member of the group consisting of oil wells and natural gas wells.

11. The high pressure trap of claim 1, wherein the tube further comprises a deflector secured to the second end.

12. The high pressure trap of claim 11, wherein the deflector consists of a rounded downward shape.

13. The high pressure trap of claim 1, wherein the particles are a member of the group consisting of rock, sand, cement, drillable plug particles, and combinations thereof.

14. The high pressure trap of claim 1, wherein the trap is made from low alloy steel.

15. A production apparatus for trapping particles from a high pressure well comprising:
 a. a Christmas tree;
 b. a choke manifold;
 c. a high pressure trap connected to the Christmas tree on one end and the choke manifold on the other end, wherein the high pressure trap comprises
  i. an inlet port connected to the Christmas tree;
  ii. a chamber having a top flange connected to the inlet port and a bottom flange connected to a bottom reservoir and a side wall connecting the top flange and the bottom flange, wherein the side wall comprises a side outlet in fluid communication with the choke manifold;
  iii. a dump outlet in communication with the bottom reservoir and connected to the bottom flange;
  iv. a dump outlet controller for opening and closing the dump outlet;
  v. a tube having a first end connected to the top flange and a second end opening into the chamber, wherein the velocity of the flow stream is changed as the flow stream exits the tube into the chamber, and wherein the tube has an inside surface and an outside surface and a plate disposed on the outside surface oriented in a helical arrangement around the outside surface for creating a cyclonic effect as the flow stream contacts the plate, and further wherein the tube is mounted within the chamber to the top flange without contacting the side wall and is disposed between the bottom reservoir and the side outlet.

* * * * *